(12) United States Patent  
Holopainen et al.

(10) Patent No.: US 12,064,792 B2  
(45) Date of Patent: Aug. 20, 2024

(54) WASTE SORTING ROBOT WITH GRIPPER THAT RELEASES WASTE OBJECT AT A THROW POSITION

(71) Applicant: MP ZENROBOTICS OY, Vantaa (FI)

(72) Inventors: Harri Holopainen, Espoo (FI); Tuomas Lukka, Helsinki (FI)

(73) Assignee: MP ZenRobotics Oy, Vantaa (FI)

( * ) Notice: Subject to any disclaimer, the term of this patent is extended or adjusted under 35 U.S.C. 154(b) by 0 days.

(21) Appl. No.: 18/250,963

(22) PCT Filed: Oct. 26, 2021

(86) PCT No.: PCT/FI2021/050722  
§ 371 (c)(1),  
(2) Date: Apr. 27, 2023

(87) PCT Pub. No.: WO2022/090625  
PCT Pub. Date: May 5, 2022

(65) Prior Publication Data  
US 2023/0405639 A1  Dec. 21, 2023

(30) Foreign Application Priority Data  
Oct. 28, 2020 (SE) .................................. 2030327-7

(51) Int. Cl.  
*B07C 5/36* (2006.01)  
*B07C 5/06* (2006.01)  
(Continued)

(52) U.S. Cl.  
CPC ................ *B07C 5/36* (2013.01); *B07C 5/065* (2013.01); *B25J 9/0093* (2013.01); *B25J 9/026* (2013.01);  
(Continued)

(58) Field of Classification Search  
CPC ... B07C 5/065; B07C 5/36; B07C 2501/0054; B07C 2501/0063; B25J 9/0093;  
(Continued)

(56) References Cited

U.S. PATENT DOCUMENTS 3,896,940 A  7/1975  Birrell  
4,305,130 A  12/1981  Kelley et al.  
(Continued)

FOREIGN PATENT DOCUMENTS

CN  1291537  4/2001  
CN  1651295  8/2005  
(Continued)

OTHER PUBLICATIONS

May 2, 2023 Int'l Preliminary Report on Patentability from PCT/FI2021/050722 (5 pgs).  
(Continued)

*Primary Examiner* — Joseph C Rodriguez  
(74) *Attorney, Agent, or Firm* — Knobbe, Martens, Olson & Bear, LLP

(57) ABSTRACT

It A waste sorting robot (100) comprises a manipulator (101) moveable within a working area (102). A gripper (103) is connected to the manipulator (101) and arranged to selectively grip a waste object (104, 104a, 104b, 104c) in the working area (102). A controller (108) is in communication with a sensor (107) and is configured to receive detected object parameters, and determine a throw trajectory (109) of the gripped waste object (104) towards a target position (106) based on the detected object parameters of the gripped waste object (104). The controller (108) is configured to send control instructions to the gripper (103) and/or manipulator (101) so that the gripper (103) and/or manipulator (101) accelerates the gripped waste object (104) and releases the waste object (104) at a throw position with a throw  
(Continued)

velocity and throw angle towards the target position (106) so that the waste object (104) is thrown along the determined throw trajectory (109). A related method of controlling a waste robot is also disclosed.

18 Claims, 8 Drawing Sheets

(51) Int. Cl.
    *B25J 9/00*            (2006.01)
    *B25J 9/02*            (2006.01)
    *B25J 9/16*            (2006.01)
    *B25J 15/06*          (2006.01)
    *B65G 47/91*          (2006.01)
    *G06N 20/00*          (2019.01)

(52) U.S. Cl.
    CPC ........... *B25J 9/1679* (2013.01); *B25J 9/1694* (2013.01); *B25J 15/0616* (2013.01); *B65G 47/917* (2013.01); *G06N 20/00* (2019.01); *B07C 2501/0054* (2013.01); *B07C 2501/0063* (2013.01); *B65G 2203/0225* (2013.01); *B65G 2203/042* (2013.01); *G05B 2219/37094* (2013.01); *G05B 2219/37134* (2013.01); *G05B 2219/37431* (2013.01); *G05B 2219/40078* (2013.01); *G05B 2219/40586* (2013.01); *G05B 2219/40607* (2013.01)

(58) Field of Classification Search
    CPC ........ B25J 9/026; B25J 9/1679; B25J 9/1694; B25J 15/0616; B65G 47/917; B65G 2203/0225; B65G 2203/042; G06N 20/00; G05B 2219/37094; G05B 2219/37134; G05B 2219/37431; G05B 2219/40078; G05B 2219/40586; G05B 2219/40607
    See application file for complete search history.

(56) References Cited

U.S. PATENT DOCUMENTS

| | | | |
|---|---|---|---|
| 4,616,121 A | 10/1986 | Clocksin | |
| 4,679,291 A | 7/1987 | Schmeal et al. | |
| 4,763,941 A | 8/1988 | Sniderman | |
| 4,835,730 A | 5/1989 | Shimano et al. | |
| 4,998,442 A | 3/1991 | Brown et al. | |
| 5,100,005 A | 3/1992 | Noble et al. | |
| 5,116,190 A | 5/1992 | Silke | |
| 5,188,411 A | 2/1993 | Golden | |
| 5,244,242 A | 9/1993 | Goedecke et al. | |
| 5,299,693 A | 4/1994 | Ubaldi et al. | |
| 5,322,272 A | 6/1994 | Benz et al. | |
| 5,423,431 A | 6/1994 | Westin | |
| 5,445,247 A | 8/1995 | Sato | |
| 5,572,785 A | 11/1996 | Tveit | |
| 5,617,338 A | 4/1997 | Sugano | |
| 5,617,898 A | 4/1997 | Nagai | |
| 5,626,378 A | 5/1997 | Puhl et al. | |
| 5,636,966 A | 6/1997 | Lyon et al. | |
| 5,733,098 A | 3/1998 | Lyon et al. | |
| 5,735,782 A | 4/1998 | Berg | |
| 5,934,864 A | 8/1999 | Lyon et al. | |
| 5,987,726 A | 11/1999 | Akeel | |
| 5,992,691 A | 11/1999 | Post et al. | |
| 6,008,636 A | 12/1999 | Miller et al. | |
| 6,024,392 A | 2/2000 | Blatt | |
| 6,056,108 A | 5/2000 | Buchi et al. | |
| 6,168,220 B1 | 1/2001 | Schmalz et al. | |
| 6,213,709 B1 | 4/2001 | Hebrank | |
| 6,256,553 B1 | 7/2001 | Erikkila | |
| 6,304,050 B1 | 10/2001 | Skaar et al. | |
| 6,331,758 B1 | 12/2001 | Takanashi et al. | |
| 6,817,639 B2 | 11/2004 | Schmalz et al. | |
| 6,967,465 B2 | 11/2005 | Takenaka et al. | |
| 7,327,112 B1 | 2/2008 | Hlynka et al. | |
| 7,415,321 B2 | 8/2008 | Okakaki et al. | |
| 7,650,203 B2 | 1/2010 | Maslov et al. | |
| 7,957,580 B2 | 6/2011 | Ban et al. | |
| 7,966,094 B2 | 6/2011 | Ban et al. | |
| 7,996,114 B2 | 8/2011 | Ban et al. | |
| 8,098,928 B2 | 1/2012 | Ban et al. | |
| 8,351,681 B2 | 1/2013 | Koike | |
| 8,380,342 B2 | 2/2013 | Ban et al. | |
| 8,606,398 B2 | 12/2013 | Eakins et al. | |
| 8,777,284 B2 | 7/2014 | Schaller et al. | |
| 8,880,217 B2 | 11/2014 | Izumi et al. | |
| 9,082,454 B2 | 7/2015 | Yao et al. | |
| 9,205,558 B1 | 12/2015 | Zevenbergen et al. | |
| 9,272,417 B2* | 3/2016 | Konolige | B25J 15/0616 |
| 9,230,329 B2 | 5/2016 | Lukka | |
| 9,486,926 B2 | 11/2016 | Kawano | |
| 9,600,798 B2 | 3/2017 | Battles et al. | |
| 9,713,875 B2 | 7/2017 | Lukka | |
| 9,789,517 B2 | 10/2017 | Doublet et al. | |
| 9,914,213 B2 | 3/2018 | Vijayanarasimhan et al. | |
| 10,449,572 B2 | 10/2019 | Ripley | |
| 10,464,105 B2* | 11/2019 | Koistinen | B65F 1/1484 |
| 10,482,120 B2 | 11/2019 | Ripley | |
| 10,576,630 B1 | 3/2020 | Diankov et al. | |
| 10,639,790 B1 | 5/2020 | Bacon et al. | |
| 11,607,807 B2* | 3/2023 | Khansari Zadeh | G06N 20/00 |
| 11,660,762 B2* | 5/2023 | Holopainen | B25J 11/008 700/258 |
| 11,851,292 B2 | 12/2023 | Lukka et al. | |
| 2002/0190230 A1 | 12/2002 | Dworkowski | |
| 2002/0193909 A1 | 12/2002 | Parker et al. | |
| 2003/0012925 A1 | 1/2003 | Gorrell | |
| 2003/0133775 A1 | 7/2003 | Specher | |
| 2004/0094979 A1 | 5/2004 | Damhuis | |
| 2005/0077856 A1 | 4/2005 | Takenaka et al. | |
| 2005/0173164 A1 | 8/2005 | Maslov et al. | |
| 2005/0218677 A1 | 10/2005 | Llich | |
| 2005/0279612 A1 | 12/2005 | Boberg | |
| 2006/0053624 A1 | 3/2006 | Maeda et al. | |
| 2007/0131213 A1 | 6/2007 | Matsuda | |
| 2007/0147678 A1 | 6/2007 | Gotting | |
| 2007/0187299 A1 | 8/2007 | Valerio | |
| 2007/0213874 A1 | 9/2007 | Oumi et al. | |
| 2007/0276539 A1 | 11/2007 | Habibi et al. | |
| 2007/0299559 A1 | 12/2007 | Jassen | |
| 2008/0150965 A1 | 6/2008 | Bischoff et al. | |
| 2008/0240511 A1 | 10/2008 | Ban et al. | |
| 2009/0025502 A1 | 1/2009 | Nakamoto | |
| 2010/0004778 A1 | 1/2010 | Arimatsu et al. | |
| 2011/0076128 A1 | 3/2011 | Johnson | |
| 2011/0231018 A1 | 9/2011 | Iwai et al. | |
| 2012/0032461 A1 | 2/2012 | Hukelmann | |
| 2013/0127192 A1 | 5/2013 | Regan et al. | |
| 2013/0127194 A1 | 5/2013 | Regan et al. | |
| 2014/0025197 A1 | 1/2014 | Mattern | |
| 2014/0036276 A1 | 2/2014 | Gross et al. | |
| 2014/0062112 A1 | 3/2014 | Ho-Young | |
| 2015/0016933 A1 | 1/2015 | Ochiishi | |
| 2015/0241203 A1 | 8/2015 | Jordil | |
| 2015/0328779 A1 | 11/2015 | Bowman et al. | |
| 2016/0332310 A1 | 11/2016 | Conall | |
| 2017/0028562 A1 | 2/2017 | Yamazaki et al. | |
| 2017/0073174 A1 | 3/2017 | Tanaka | |
| 2017/0174439 A1 | 6/2017 | Ripley | |
| 2017/0291308 A1 | 10/2017 | Junichi | |
| 2017/0355083 A1 | 12/2017 | Wigren | |
| 2018/0036774 A1 | 2/2018 | Lukka et al. | |
| 2018/0050451 A1 | 2/2018 | Takanishi et al. | |
| 2018/0127219 A1 | 5/2018 | Wagner et al. | |
| 2019/0030571 A1 | 1/2019 | Horowitz et al. | |
| 2019/0039838 A1 | 2/2019 | Curhan et al. | |
| 2019/0084012 A1 | 3/2019 | McCoy et al. | |
| 2019/0126478 A1* | 5/2019 | Scott | B25J 15/0608 |
| 2019/0130560 A1 | 5/2019 | Horowitz et al. | |
| 2019/0217342 A1 | 7/2019 | Parr et al. | |
| 2019/0291283 A1 | 9/2019 | Kurz | |

(56) References Cited

U.S. PATENT DOCUMENTS

| | | | |
|---|---|---|---|
| 2019/0361672 A1 | 11/2019 | Odhner et al. | |
| 2019/0389082 A1 | 12/2019 | Higo | |
| 2020/0048015 A1 | 2/2020 | Martin et al. | |
| 2020/0077074 A1 | 3/2020 | Denenberg et al. | |
| 2020/0087118 A1 | 3/2020 | Sato et al. | |
| 2020/0130935 A1* | 4/2020 | Wagner | B65G 1/1371 |
| 2020/0269429 A1* | 8/2020 | Chavez | B25J 15/0052 |
| 2020/0290214 A1 | 9/2020 | Watanabe et al. | |
| 2021/0061588 A1 | 3/2021 | Lukka et al. | |
| 2021/0114062 A1* | 4/2021 | Liu | B07C 3/00 |
| 2021/0206586 A1* | 7/2021 | Douglas | B65G 47/902 |
| 2021/0237260 A1 | 8/2021 | Holopainen et al. | |
| 2021/0237262 A1 | 8/2021 | Holopainen et al. | |
| 2023/0144252 A1 | 5/2023 | Lukka et al. | |
| 2023/0191608 A1* | 6/2023 | Horowitz | B25J 9/163 700/245 |
| 2023/0241787 A1 | 8/2023 | Holopainen et al. | |
| 2024/0042624 A1 | 2/2024 | Holopainen | |

FOREIGN PATENT DOCUMENTS

| | | |
|---|---|---|
| CN | 101088720 | 12/2007 |
| CN | 101471546 | 7/2009 |
| CN | 101618444 | 1/2010 |
| CN | 101508181 | 4/2011 |
| CN | 102431787 | 5/2012 |
| CN | 203212009 | 9/2013 |
| CN | 103787059 | 5/2014 |
| CN | 204057223 | 12/2014 |
| CN | 104513012 | 4/2015 |
| CN | 104589351 | 5/2015 |
| CN | 105196302 | 12/2015 |
| CN | 105215076 | 1/2016 |
| CN | 105372510 | 3/2016 |
| CN | 107363405 | 11/2017 |
| CN | 107650139 | 2/2018 |
| CN | 107738264 | 2/2018 |
| CN | 106362957 | 5/2018 |
| CN | 108013841 | 5/2018 |
| CN | 108032324 | 5/2018 |
| CN | 108971190 | 12/2018 |
| CN | 109013384 | 12/2018 |
| CN | 109176522 | 1/2019 |
| CN | 109249402 | 1/2019 |
| CN | 109433633 | 3/2019 |
| CN | 110116415 | 8/2019 |
| CN | 209866708 | 12/2019 |
| DE | 2455284 | 5/1976 |
| DE | 4127446 | 5/1995 |
| DE | 4440748 A1 | 5/1996 |
| DE | 10319253 A1 | 12/2004 |
| DE | 102010029662 | 12/2011 |
| DE | 102015009998 | 2/2016 |
| DE | 102015220413 | 4/2017 |
| DK | 3056289 | 1/2019 |
| EP | 0253229 | 1/1988 |
| EP | 0706838 | 4/1996 |
| EP | 1466704 | 10/2004 |
| EP | 1810795 | 7/2007 |
| EP | 1918479 | 5/2008 |
| EP | 2476813 | 7/2012 |
| EP | 2585256 | 5/2013 |
| EP | 2694224 | 2/2014 |
| EP | 2758216 | 7/2014 |
| EP | 2810901 | 3/2016 |
| EP | 3056288 | 8/2016 |
| EP | 3056289 | 8/2016 |
| EP | 3236083 | 10/2017 |
| EP | 3254998 | 12/2017 |
| EP | 3496873 | 6/2019 |
| EP | 3626412 | 3/2020 |
| EP | 3658302 | 6/2020 |
| EP | 3672764 | 7/2020 |
| EP | 3674040 | 7/2020 |
| EP | 3677388 | 7/2020 |
| GB | 2325915 | 12/1998 |
| GB | 2354752 A | 4/2001 |
| IT | MI20 081 360 | 1/2010 |
| JP | S5045304 | 4/1975 |
| JP | 61-249292 | 11/1986 |
| JP | H01 240287 | 9/1989 |
| JP | H03154793 | 7/1991 |
| JP | H4176583 | 6/1992 |
| JP | H0489687 | 8/1992 |
| JP | H05228780 | 9/1993 |
| JP | H05318369 | 12/1993 |
| JP | H0630857 | 4/1994 |
| JP | H0740273 | 2/1995 |
| JP | 05089337 | 12/1996 |
| JP | H092682 | 1/1997 |
| JP | 9131575 | 5/1997 |
| JP | H1069315 | 3/1998 |
| JP | 10-202571 | 8/1998 |
| JP | H11198076 | 7/1999 |
| JP | H11320461 | 11/1999 |
| JP | 2001138280 | 5/2001 |
| JP | 2002301683 | 10/2002 |
| JP | 2003031636 | 1/2003 |
| JP | 2003223642 | 8/2003 |
| JP | 2005117791 | 4/2005 |
| JP | 3684278 | 8/2005 |
| JP | 2007040273 | 2/2007 |
| JP | 2010089238 | 4/2010 |
| JP | 4947691 | 6/2012 |
| JP | 2012115916 | 6/2012 |
| JP | 2013252568 | 12/2013 |
| JP | 2014516810 | 4/2014 |
| JP | 5688924 | 3/2015 |
| JP | 2016068034 | 5/2016 |
| JP | 2016225336 | 12/2016 |
| JP | 2020022929 | 2/2020 |
| JP | 2020022930 A | 2/2020 |
| JP | 2020062633 | 4/2020 |
| KR | 20190050145 | 5/2019 |
| KR | 20190071387 | 6/2019 |
| SU | 1 399 116 | 5/1988 |
| WO | WO 89/08537 | 9/1989 |
| WO | WO 89/012019 | 12/1989 |
| WO | WO 9524544 A1 | 9/1995 |
| WO | WO 98/019799 | 5/1998 |
| WO | WO 2008/102052 | 8/2008 |
| WO | WO 2011/161304 | 12/2011 |
| WO | WO 2012/052615 | 4/2012 |
| WO | WO 2012/089928 | 7/2012 |
| WO | WO 2012/156579 | 11/2012 |
| WO | WO 2013/068115 | 5/2013 |
| WO | WO 2014/202998 | 12/2014 |
| WO | WO 2016/070412 | 5/2016 |
| WO | WO 2019/056102 | 3/2019 |
| WO | WO 2019/207201 | 10/2019 |
| WO | WO 2019207202 A1 | 10/2019 |
| WO | WO 2019215384 A1 | 11/2019 |
| WO | WO 2020/053195 | 3/2020 |
| WO | WO2020/079125 | 4/2020 |
| WO | WO 2020/082176 | 4/2020 |

OTHER PUBLICATIONS

International Search Report in PCT/FI2021/050722 dated Jan. 19, 2022.
Office Action received in Swedish Application No. 2030327-7 dated Jun. 29, 2021.
Boudaba et al., "Grasping of Planar Objects using Visual Perception", Article, p. 605-611.
Chinese Office Action, dated Apr. 3, 2015, in corresponding Chinese Patent Application No. 201280056743.X.
Cort, "Robotic parts feeding," Assembly, Jun. 2007, https://www.assemblymag.com/articles/86446-robotic-parts-feeding.
Extended European Search Report issued in PCT/FI2019/050322 dated Mar. 29, 2022.
Extended European Search Report issued in PCT/FI2019/050322 dated Aug. 31, 2022.

(56) References Cited

OTHER PUBLICATIONS

Extended European Search Report issued in PCT/FI2019/050320 dated Jan. 24, 2022.
Finnish Search Report dated Jun. 19, 2012, corresponding to the Foreign Priority Application No. 20115923.
Fujimoto et al., Image-Based Visual Serving for Grasping Unknown Objects, Article, p. 876-881.
International Preliminary Report on Patentability issued in PCT/FI2021/050720 dated May 2, 2023.
International Search Report issued in PCT/FI2012/050909 dated Mar. 4, 2013.
International Search Report and Written Opinion of PCT/FI2019/050319, dated Jul. 29, 2019, in 17.
International Search Report and Written Opinion issued in PCT/FI2019/050320 dated Jul. 30, 2019.
International Search Report and Written Opinion of PCT/FI2019/050321, dated Jul. 30, 2019, in 13 pages.
International Search Report and Written Opinion issued in PCT/FI2019/050322 dated Aug. 28, 2019.
International Search Report issued in PCT/FI2021/050453 dated Sep. 2, 2021.
International Search Report and Written Opinion issued in PCT/IF2021/050088 dated May 4, 2021.
International Search Report issued in PCT/FI2021/050720 dated Nov. 16, 2021.
Jang et al., "Visibility-based spatial reasoning for object manipulation in cluttered environments", Apr. 2008, pp. 42-438, vol. 40, Issue 4.
Japanese Office Action dated Aug. 25, 2015; Application No. 2013-546749.
Japanese Office Action dated Jul. 25, 2016; Application No. 2014-531283.
Kristensen et al., "Bin-picking with a solid state range camera", Jun. 30, 2001, pp. 143-151, vol. 35, Issues 3-4.
Morales et al., "Vision-based three-finger grasp synthesis constrained by hand geometry," Article, Jun. 30, 2006, p. 496-512, vol. 54, Issue 6.
Search Report received in Swedish Application No. 2030211-3 dated Feb. 4, 2021.
Office Action received in Swedish Application No. 2030325-1 dated Jun. 28, 2021.
Wong et al., "Vision Strategies for Robotic Manipulation of Natural Objects," Article, Dec. 2-4, 2009, p. 8, New Zealand.
Yanagihara et al., "Parts-picking in Disordered Environment," Article, Nov. 3-5, 1991, p. 517-522, Japan.

\* cited by examiner

WASTE SORTING ROBOT WITH GRIPPER THAT RELEASES WASTE OBJECT AT A THROW POSITION

The present disclosure relates to a waste sorting robot for sorting waste objects.

In the waste management industry, industrial and domestic waste is increasingly being sorted in order to recover and recycle useful components. Each type of waste, or "fraction" of waste can have a different use and value. If waste is not sorted, then it often ends up in landfill or incinerated which has an undesirable environmental and economic impact.

It is known to sort industrial and domestic waste using a waste sorting robot. The waste sorting robot picks waste objects from a conveyor with a gripper and moves the object to a sorting location depending on the type of waste object.

A previous problem is the limited speed by which waste sorting robots can be operated. The speed of operation limits the flow of waste objects to be sorted, and ultimately the throughput and value of this type of automated recycling. Adding further waste sorting robots along the conveyor increases the cost of the waste sorting system, as well as the footprint and complexity of the system.

Examples described hereinafter aim to address the aforementioned problems.

In a first aspect of the disclosure, there is provided a waste sorting robot comprising a manipulator movable within a working area, a gripper connected to the manipulator, wherein the gripper is arranged to selectively grip a waste object in the working area at a picking position and throw the waste object to a target position. The waste sorting robot comprises a sensor configured to detect object parameters of the waste objects, the object parameters comprising the orientation and/or physical characteristics of the respective waste objects. The waste sorting robot comprises a controller in communication with the sensor and being configured to receive the detected object parameters, wherein, for the respective waste objects being selectively gripped by the gripper, the controller is configured to determine an associated throw trajectory of the gripped waste object towards the target position based on the detected object parameters of the gripped waste object, and send control instructions to the gripper and/or manipulator so that the gripper and/or manipulator accelerates the gripped waste object and releases the waste object at a throw position with a throw velocity and throw angle towards the target position so that the waste object is thrown along the determined throw trajectory associated with the waste object, from the throw position to the target position.

Optionally, the physical characteristics comprises geometrical and/or material characteristics of the respective waste objects.

Optionally, the geometrical and/or material characteristics of the waste objects comprises size, shape, density, surface properties, and/or composition of the waste objects.

Optionally, the sensor comprises any of an image sensor, a force sensor, a motion sensor, an electric current sensor, a temperature sensor, a chemical sensor.

Optionally, the controller is configured to determine the throw trajectory based on the object parameters and the picking position, and/or the position of the target position.

Optionally, the throw position is determined based on the object parameters.

Optionally, the throw position is off-set a distance from the picking position, in a direction towards the target position.

Optionally, the controller is configured to determine the throw velocity of the throw trajectory by calculating a parabola of a projectile motion of the gripped waste object.

Optionally, the controller is configured to determine a mass of the gripped waste object from the object parameters, and determine an acceleration of the gripped waste object based on the mass so that the waste object is thrown with the throw velocity from the throw position to the target position.

Optionally, accelerating the gripped waste object to the throw velocity comprises applying a force to the gripped waste object during time by a movement of the gripper and/or manipulator, and/or by applying an air- or gas flow to the gripped waste object, wherein the air- or gas flow is ejected from the gripper.

Optionally, the controller is configured to determine the throw trajectory by determining a drag force of the waste objects based on the detected object parameters.

Optionally, the controller is configured to determine a shape and/or cross-sectional area of the waste objects based on the geometrical characteristics, and determining the drag force as being proportional to a drag coefficient based on the shape, and/or as being proportional the cross-sectional area.

Optionally, a throw sensor (112) configured to determine the position of a waste object after being thrown to the target position, the controller is configured to receive said position as throw data, associate the throw data and the detected object parameters of the thrown waste object to a waste object model to be applied to subsequently gripped waste objects, determine deviations in the position of the thrown waste object by comparing the throw data with the throw trajectory, determine control instructions to the gripper and/or manipulator based on the deviations, and associate the determined control instructions to the waste object model.

Optionally, the controller is configured to input the throw data and the object parameters to a machine learning-based model to determine the control instructions for subsequently gripped waste objects.

In a second aspect of the disclosure, there is provided a method of controlling a waste robot comprising moving a manipulator within a working area, controlling a gripper connected to the manipulator to selectively grip a waste object in the working area at a picking position and throw the waste object to a target position, determining object parameters of the waste objects, the object parameters comprising the orientation and/or physical characteristics of the respective waste objects, wherein, for the respective waste objects being selectively gripped by the gripper, the method comprises determining an associated throw trajectory of the gripped waste object towards the target position based on the determined object parameters and picking position of the gripped waste object, sending control instructions to the gripper and/or manipulator so that the gripper and/or manipulator accelerates the gripped waste object and releases the waste object at a throw position with a throw velocity and throw angle towards the target position so that the waste object is thrown along the determined throw trajectory associated with the waste object, from the throw position to the target position.

In a third aspect of the disclosure, a computer program product comprising instructions which, when the program is executed by a computer, cause the computer to carry out the steps of the method according to the second aspect.

Various other aspects and further examples are also described in the following detailed description and in the attached claims with reference to the accompanying drawings, in which:

Figure 1:
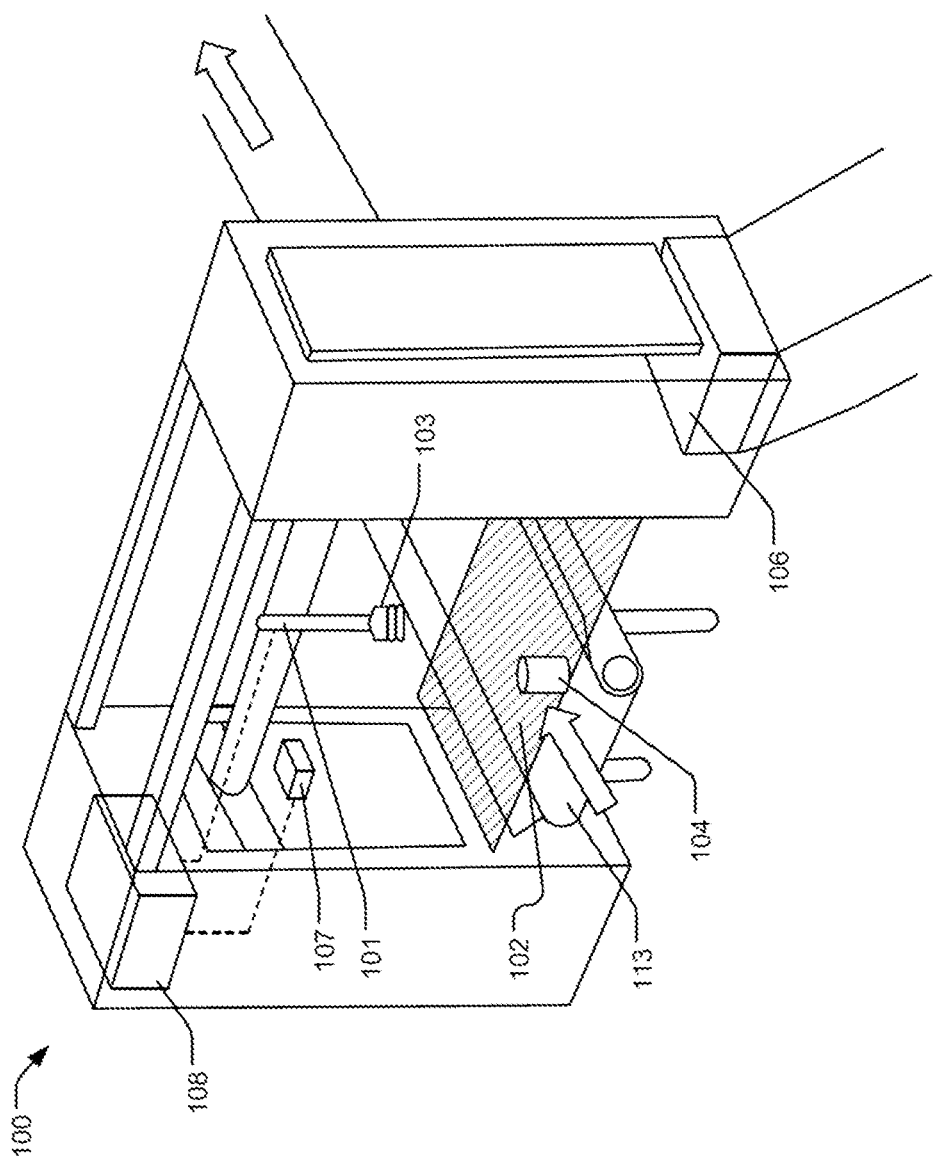
FIG. 1 shows a perspective view of a waste sorting robot.

FIG. 1 shows a perspective view of a waste sorting robot 100. In some examples, the waste sorting robot 100 can be a waste sorting gantry robot 100. The examples described below can also be used with other types of robot such as robot arms or delta robots. In some other examples, the waste sorting robot 100 is a Selective Compliance Assembly Robot Arm (SCARA). The different types of robot are collectively referred to as waste sorting robot 100 below for brevity.

The waste sorting robot 100 comprises a manipulator 101 which is movable within a working area 102. The waste sorting robot 100 comprises a gripper 103 which is connected to the manipulator 101. The gripper 103 is arranged to selectively grip a waste object 104 which moves into the working area 102 on a conveyor belt 113. The gripper 103 may comprise a pneumatic suction gripper holding and releasing waste objects 104 by a varying air- or gas pressure. Alternatively, or in addition, the gripper 103 may comprise movable jaws to pinch the waste object 104 with a releasable grip. The conveyor belt 113 may be a continuous belt, or a conveyor belt formed from overlapping portions. The conveyor belt 113 may be a single belt or alternatively a plurality of adjacent moving belts (not shown). In other examples, the waste object 104 can be conveyed into the working area 102 via other conveying means. The conveyor belt 113 can be any suitable means for moving the waste object 104 into the working area 102. For example, the waste object 104 may be fed under gravity via a slide (not shown) to the working area 102.

Figure 2:
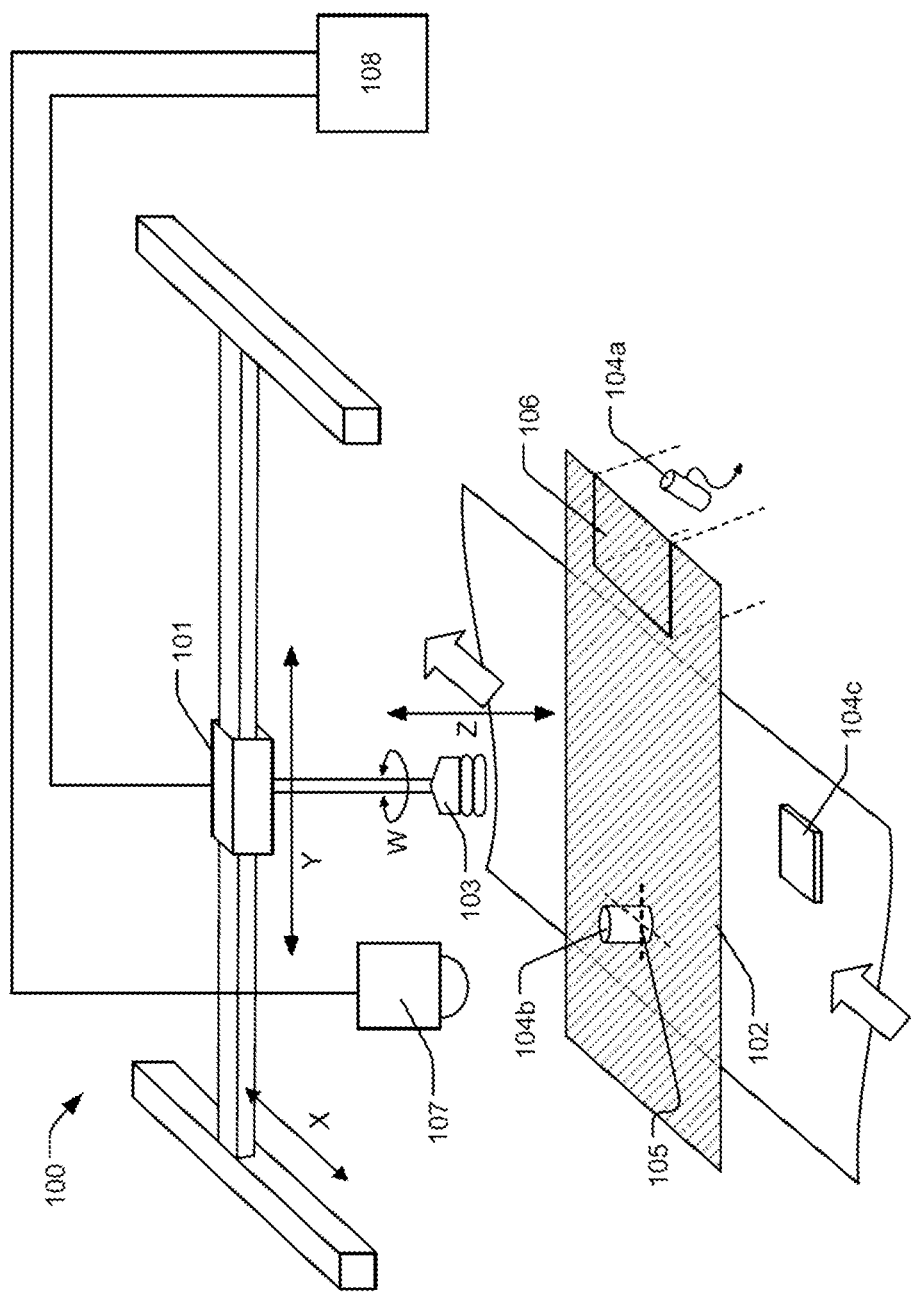
FIG. 2 shows a further perspective view of a waste sorting robot.

The working area 102 is an area within which the manipulator 101 and gripper 103 is able to reach and interact with the waste object 104. The working area 102 as shown in FIG. 1 is a cross hatched area beneath the gripper 103. FIG. 1 shows only one waste object 104 for clarity, but it should be understood that any number of waste objects 104 may move into the working area 102. The schematic view of a waste sorting robot 100 in FIG. 2 shows a plurality of waste objects 104a, 104b, 104c, collectively referred to as waste object 104 for brevity unless otherwise indicated.

The gripper 103 is arranged to grip the waste object 104 in the working area 102, at a momentaneous position referred to as a picking position 105 below, and throw the waste object 104 to a target position 106. FIG. 2 is a schematic illustration of a waste object 104b having a momentaneous picking position 105, and a target position 106 where a previous waste object 104a has been thrown by the gripper 103. The working area 102 may extend over the target position 106 as indicated by the cross hatched area beneath the gripper 103 in FIG. 2, to allow the gripper 103 to throw a waste object 104 onto the target position 106 with a vertical throw, as described further below with respect to FIG. 6.

The manipulator 101, and the gripper 103 connected thereto, is configured to move within a working volume defined by the height above the working area 102 where the waste sorting robot 100 can manipulate the waste object 104. In some examples, the manipulator 101 is moveable along a plurality of axes. In some examples, the manipulator 101 is moveable along three axes which are substantially at right angles to each other. In this way, the manipulator 101 is movable in an X-axis which is parallel with the longitudinal axis of the conveyor belt 113 ("beltwise"). Additionally, the manipulator 101 is movable across the conveyor belt 113 in a Y-axis which is perpendicular to the longitudinal axis of the conveyor belt 113 ("widthwise"). The manipulator 101 is movable in a Z-axis which is in a direction normal to the working area 102 and the conveyor belt 113 ("heightwise"). Optionally, the manipulator 101 and/or gripper 103 can rotate about one or more axes (W), as schematically indicated in FIG. 2. The waste sorting robot 100 may comprise one or more servos, pneumatic actuators or any other type of mechanical actuator for moving the manipulator 101 and gripper 103 in one or more axes. For the purposes of clarity, the servos, pneumatic actuators or mechanical actuators are not shown in the Figures.

The waste sorting robot 100 is arranged to sort the waste object 104 into fractions according to one or more parameters of the waste object 104. The waste objects 104 can be any type of industrial waste, commercial waste, domestic waste or any other waste which requires sorting and processing. Unsorted waste material comprises a plurality of fractions of different types of waste. Industrial waste can comprise fractions, for example, of metal, wood, plastic, hardcore and one or more other types of waste. In other examples, the waste can comprise any number of different fractions of waste formed from any type or parameter of waste. The fractions can be further subdivided into more refined categories. For example, metal can be separated into steel, iron, aluminium etc. Domestic waste also comprises different fractions of waste such as plastic, paper, cardboard, metal, glass and/or organic waste. A fraction is a category of waste that the waste can be sorted into by the waste sorting robot 100. A fraction can be a standard or homogenous composition of material, such as aluminium, but alternatively a fraction can be a category of waste defined by a customer or user.

The waste sorting robot 100 comprises a sensor 107 configured to detect object parameters of the waste objects 104, and a controller 108 in communication with the sensor 107 which is configured to receive the detected object parameters. The controller 108 may thus be configured to send movement instructions to the manipulator 101 and gripper 103 for interacting with the waste objects 104 to be sorted, based on the detected object parameters. I.e. the gripper 103 may selectively grip the waste objects 104 to be sorted as mentioned above. The controller 108 may thus be configured to send instructions to the X-axis, Y-axis and Z-axis drive mechanisms of the manipulator 101 and gripper 103 to control and interact with the waste objects 104 on the conveyor belt 113. Various information processing techniques can be adopted by the controller 108 for controlling the manipulator 101 and gripper 103. Such information processing techniques are described in WO2012/089928, WO2012/052615, WO2011/161304, WO2008/102052 which are incorporated herein by reference. The control of the waste sorting robot 100 is discussed in further detail in reference to FIGS. 3-6 below.

The controller 108 is thus configured to receive the detected object parameters from the sensor 107. The object parameters comprise the orientation and/or physical characteristics of the respective waste objects 104. The orientation of a waste object 104 should be construed as the orientation in the working volume in the X, Y, Z-directions. For example, two waste objects 104 of identical size and shape may have different orientations when being transported on the conveyor belt 113, since the waste object 104 may lay on different sides on the conveyor belt 113. The orientation of such waste objects 104 may thus also be different when being held in place in the gripper 103, since the gripper 103 typically grips the waste objects 104 from a top-down approach, regardless of the orientation of the waste objects 104 on the conveyor belt 113. The physical characteristics may comprise geometrical characteristics of the respective waste objects 104, such as the shape, size, and/or volume. Alternatively, or in addition, the physical characteristics may comprise material characteristics, such as from what material the waste object 104 is made, density, and/or surface properties of the waste object 104.

Figure 3A:
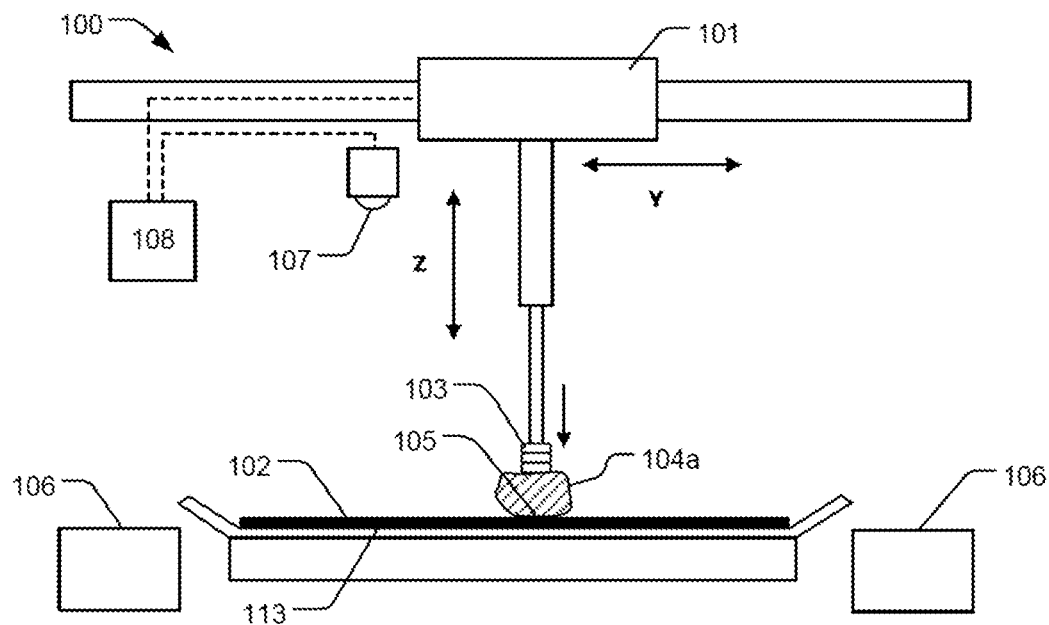
FIG. 3a shows a schematic front view of a waste sorting robot, where a gripper has engaged with a waste object.
Figure 3B:
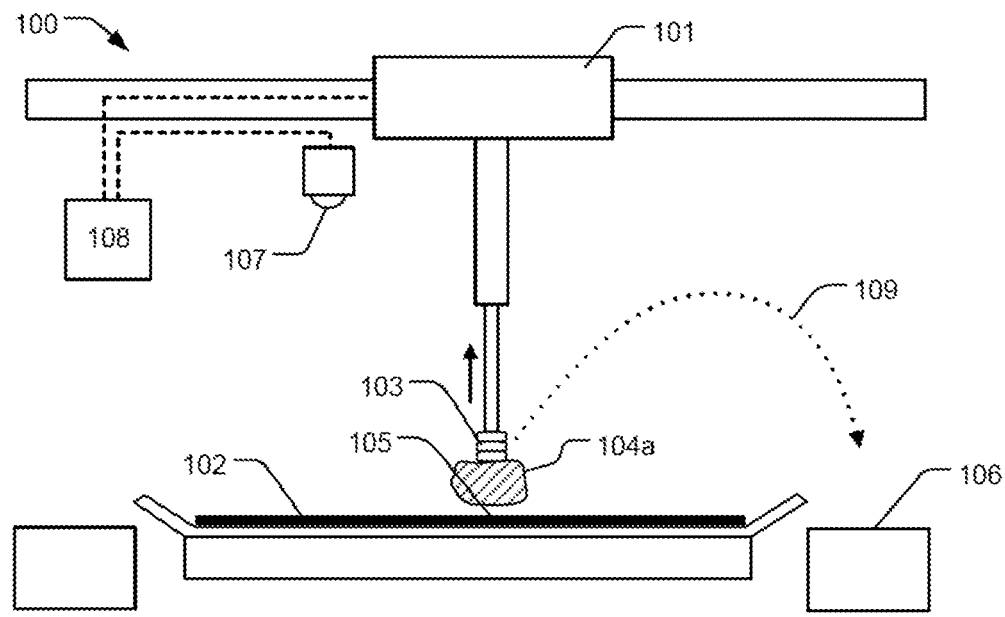
FIG. 3b shows a position of the gripper, subsequent to the position shown in FIG. 3a, where the gripper has lifted the waste object from the conveyor belt.
Figure 3C:
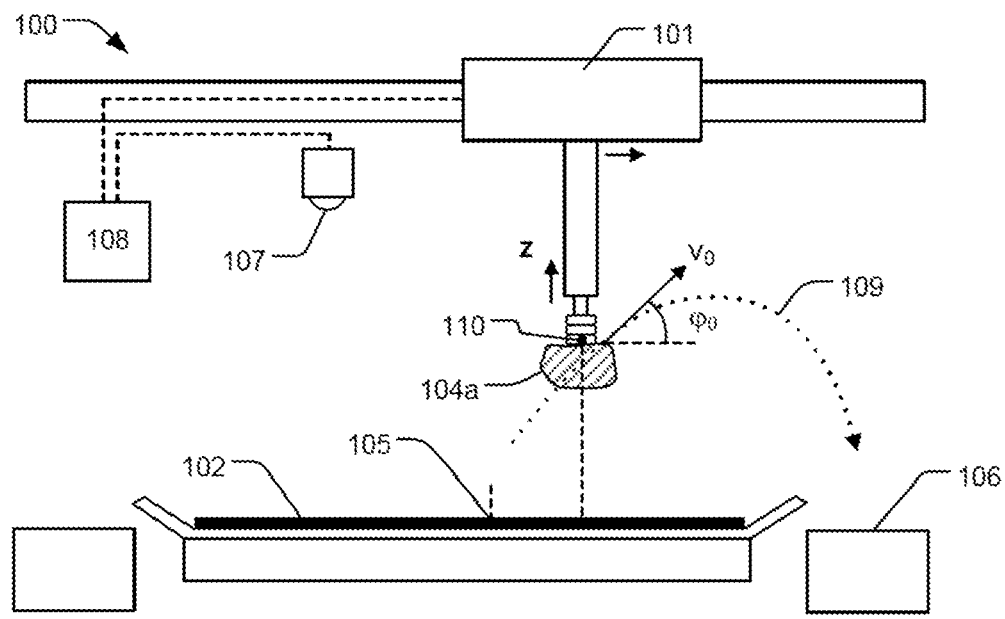
FIG. 3c shows a position of the gripper, subsequent to the position shown in FIG. 3b, where the gripper is positioned at a throw position where the waste object is thrown to a target position.
Figure 3D:
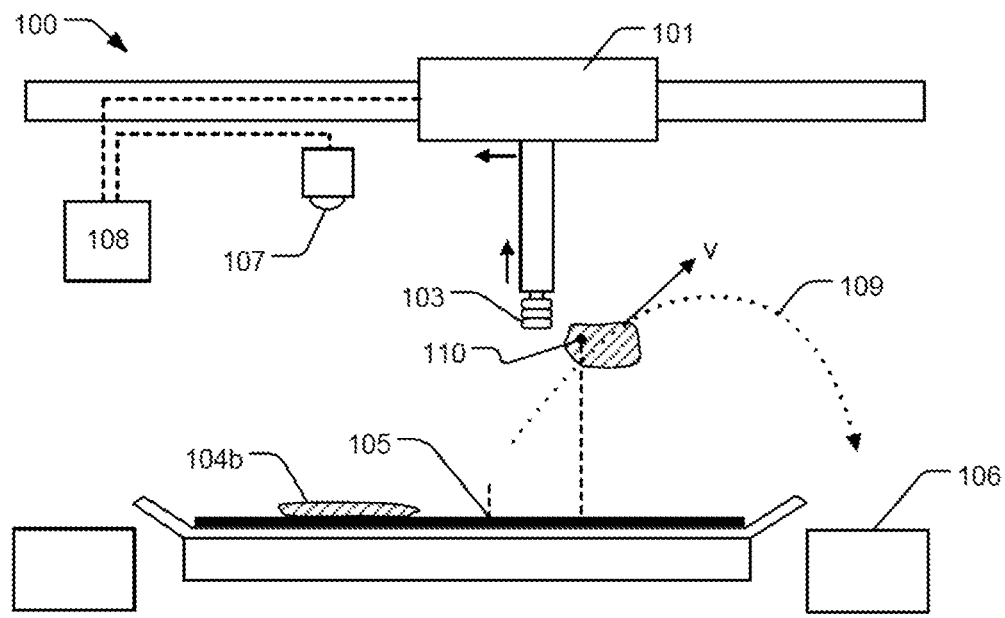
FIG. 3d shows a position of the gripper, subsequent to the position shown in FIG. 3c, where the gripper moves in a direction towards a next waste object after having thrown the previous waste object towards the target position.
Figure 3E:
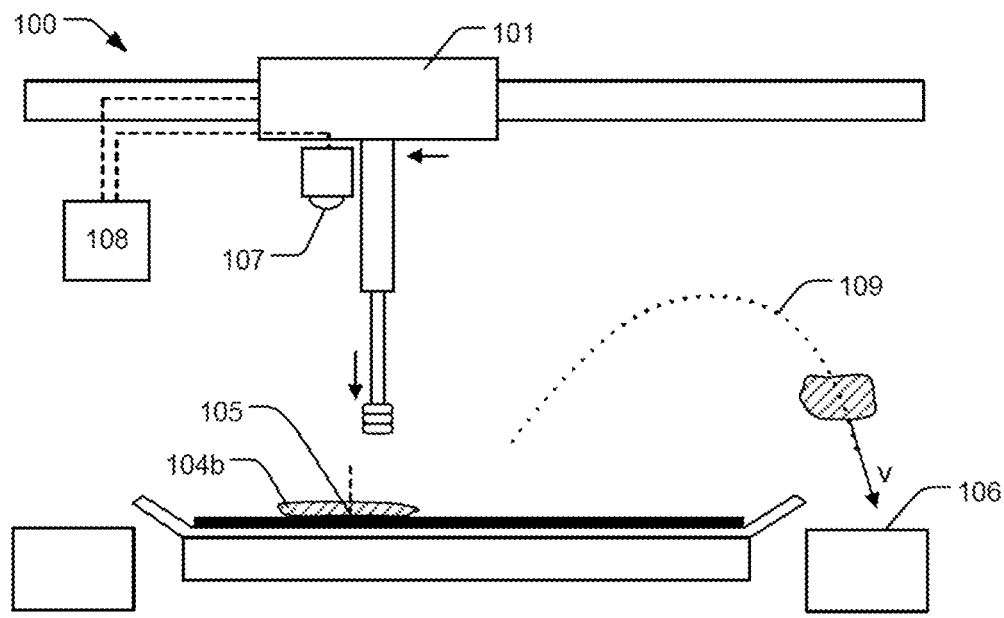
FIG. 3e shows a position of the gripper, subsequent to the position shown in FIG. 3d, where the gripper continues to move in a direction towards the next waste object on the conveyor after having thrown the previous waste object towards the target position.

The controller 108 is configured to determine an associated throw trajectory 109 of the respectively gripped waste object 104 towards the target position 106 based on the detected object parameters of said gripped waste object 104. FIG. 3*a* is a schematic illustration of a waste sorting robot 100 where the gripper 103 has engaged a waste object 104*a* in the working area 102, but not yet lifted the waste object 104*a* from the conveyor belt 113. The sensor 107 may be configured to detect object parameters of the waste object 104*a* prior to engaging the waste object 104*a* with the gripper 103, as mentioned above, e.g. in case the sensor 107 comprises an image sensor or any other sensor configured to detect object parameters remotely. The object parameters may in one example comprise information about the size of the engaged waste object 104*a*. The controller 108 may thus be configured to determine a throw trajectory 109 of the waste object 104*a* based on the size thereof, as schematically indicated in FIG. 3*b*. Turning now to FIG. 3*c*, the controller 108 is configured to send control instructions to the gripper 103 and/or the manipulator 101 so that the gripper 103 and/or the manipulator 101 accelerates the gripped waste object 104*a* and releases the waste object 104*a* at a throw position 110. The waste object 104*a* is released with a throw velocity ($v_0$) and throw angle ($\varphi_0$) towards the target position 106, so that the waste object 104*a* is thrown along the determined throw trajectory 109, associated with the waste object 104*a*, from the throw position 110 to the target position 106. FIG. 3*c* is a schematic illustration of the momentaneous position of the gripper 103 at the throw position 110, where the waste object 104*a* is released from the gripper 103. The waste object 104*a* has thrown a throw velocity ($v_0$) and throw angle ($\varphi_0$) when being released, as indicated in FIG. 3*c*. FIG. 3*d* is a schematic illustration of the momentaneous position of the waste object 104*a* shortly after being released at throw position 110. The waste object 104*a* has a velocity (v) along the determined throw trajectory 109. The controller 108 may be configured to instruct the manipulator 101 and gripper 103 to move to the next identified waste object 104*b* to be picked from the conveyor belt 113, as soon as the first waste object 104*a* has been released at the throw position 110. FIG. 3*d* illustrates the gripper 103 moving towards the next waste object 104*b*, and FIG. 3*e* illustrates the gripper 103 having moved even closer to the next waste object 104*b*, compared to the position in FIG. 3*d*, while the first waste object 104*a* has a velocity (v) towards the target position 106 along the determined throw trajectory 109.

Figure 3F:
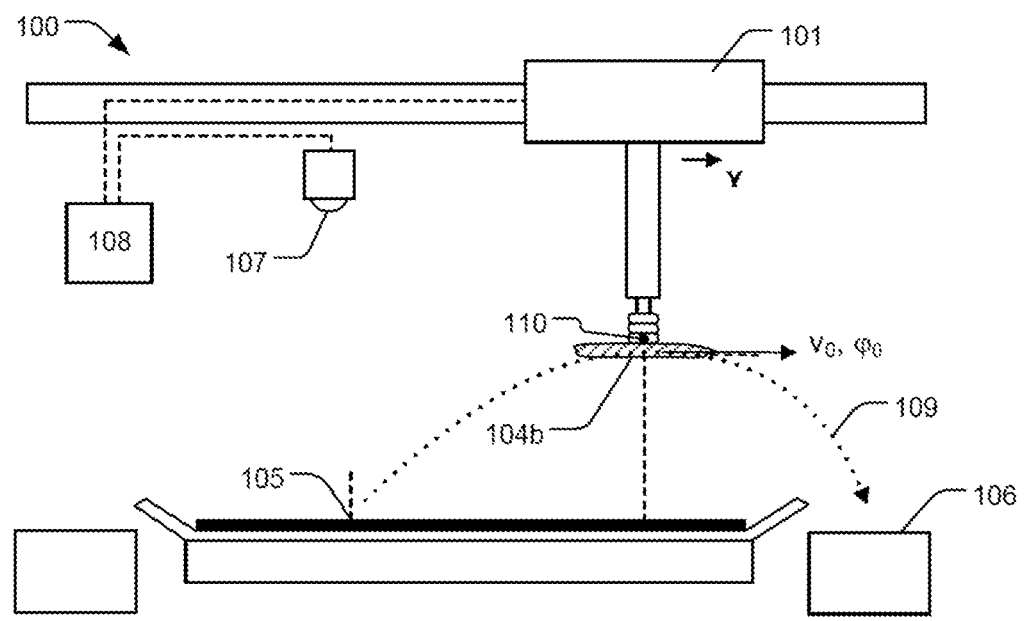
FIG. 3f shows a position of the gripper, subsequent to the position shown in FIG. 3e, where the gripper has moved the next waste object to a new throw position where the next waste object is thrown to the target position.

FIG. 3*f* is a further schematic illustration where the second waste object 104*b* has been picked from a picking position 105 and moved to a subsequent throw position 110. As described with respect to the first waste object 104*a*, the controller 108 is configured to receive object parameters of the second waste object 104*b* from the sensor 107. The object parameters of the second waste object 104*b* may comprise information that the second waste object 104*b* has a different size and/or shape, and/or different material composition, and/or different orientation on the conveyor belt 113, compared to the first waste object 104*a*. The controller 108 is configured to determine a throw trajectory 109 of the second waste object 104*b* towards target position 106 based on the object parameters associated with the second waste object 104*b*. The target position 106 for the second waste object 104*b* may be different than the target position 106 for the first waste object 104*a* in one example. In the example in FIG. 3*f*, the object parameters of the second waste object 104*b* may comprise information that the second waste object 104*b* has a more flattened shape compared to the first waste object 104*a*. In one example, the flat waste object 104*b* may be a sheet of material, such as metal, paper, or plastic, while the first waste object 104*a* may be from the same material, but crumbled to rounder shape. Determining the throw trajectory 109 of the second waste object 104*b* may thus take into account the shape of the second waste object 104*b* results in a different motion through the air after being released by the gripper 103. In the example of FIG. 3*f* a flat object may have a more erratic and unpredictable motion through the air, due to an increased drag coefficient, compared to an object which is shaped closer to a sphere. The drag force is discussed further below. Hence, the controller 108 may be configured to determine a throw position 110 closer to the target position 106 for the second waste object 104*b*, compared to the throw position 110 for the first waste object 104*a*. Reducing the distance between the throw position 110 and the target position 106 may be advantageous for waste objects 104 that move unpredictably through the air after being released at the throw position 110, as described further with reference to FIG. 6. FIG. 3*f* indicates releasing the second waste object 104*b* with a throw velocity ($v_0$) and throw angle ($\varphi_0$) at the throw position 110 so that the second waste object 104*b* follows a trajectory 109 to the target position 106.

Figure 6:
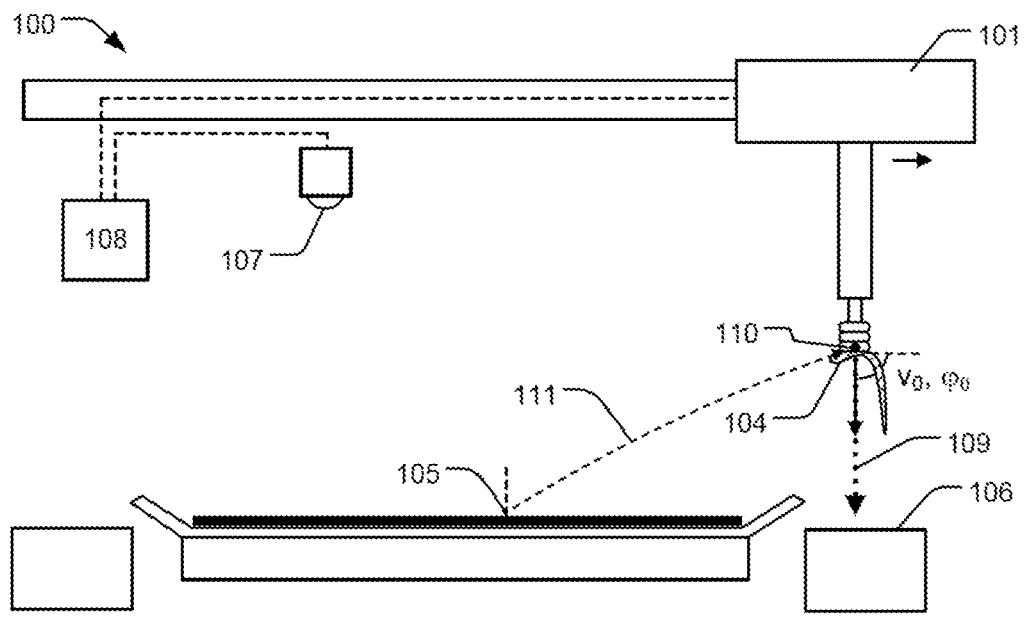
FIG. 6 shows a schematic front view of a waste sorting robot, where a gripper has moved another waste object to a throw position where the waste object is thrown to a target position along a throw trajectory.

In one example the waste objects 104 may have essentially the same object parameters with respect to the geometrical characteristics, i.e. same size and shape, but the material characteristics may be different. The densities of the waste objects 104 may vary, and accordingly the weight. Determining the throw trajectory 109 may thus take into account the different weights of the waste objects 104. E.g. a heavier object needs to be accelerated for a longer duration by the gripper 103 and/or manipulator 101 to reach a desired throw velocity ($v_0$), compared to a lighter object, due to the increased inertia of the heavier object. Other material characteristics may include structural parameters such as the flexibility of the waste objects 104. E.g. the waste object 104$b$ in FIG. 3$f$ and the waste object 104 indicated in FIG. 6 may appear to have the same geometrical parameters when transported to the working area 102, but waste object 104$b$ may be a rigid plastic sheet, whereas waste object 104 in FIG. 6 may be a flexible plastic bag. In the latter case, the gripper 103 may move to a throw position 110 vertically above the target position 106, so that the waste object 104 may be thrown into the target position 106 with zero horizontal velocity, i.e. along a vertical throw trajectory 109 as indicated in FIG. 6. Such throw trajectory 109 may be particularly advantageous for highly flexible and light objects that experience a significant drag force and unpredictable movement patterns when thrown in the air.

In a further example the waste objects 104 may have essentially the same object parameters with respect to the geometrical characteristics and the material characteristics, but the orientation of the waste objects 104 on the conveyor belt 113 may vary. The orientation of the waste objects 104 when held in place by the gripper 103 may thus also vary, if the waste objects 104 are gripped from the same top-down approach. For example, a rectangular waste object 104 which has one side significantly shorter than the remaining two, e.g. shaped like a text book, may have different trajectories through the air depending on which side is facing the throw direction. The waste object 104 may experience less drag if the shortest side is facing the throw direction, thus cutting through the air with less air resistance. Hence, the detected object parameters may comprise information of the orientation of the waste objects 104 to determine the associated throw trajectories 109.

Determining a throw trajectory 109 of the respectively gripped waste objects 104, based on the detected object parameters provides for optimizing the useful time interval the manipulator 101 and gripper 103 interacts with each waste object 104. E.g. determining the required throw velocity ($v_0$) of a first waste object 104$a$ to follow a throw trajectory 109 to the target position 106 allows for minimizing the amount of time the gripper 103 needs to carry the first waste object 104$a$ before being thrown. The first waste object 104$a$ may be thrown quickly at a throw position 110 just after being accelerated to the throw velocity ($v_0$), and the gripper 103 may immediately target the next identified waste object 104$b$. A subsequently gripped waste object 104 may have associated object parameters which dictate a different throw trajectory 109 and the gripper 103 and/or manipulator 101 may be controlled to throw the waste object 104 accordingly. The optimized throwing of the waste objects 104 to the target positions 106 as described in the examples above provides for a more effective waste sorting robot 100. This means that the sorting speed can be increased. The speed of the conveyor belt 113 and/or the amount of waste objects 104 on the conveyor belt 113 may be increased. In one example, by increasing the speed of the conveyor belt 113, the objects to be sorted on the conveyor belt 113 are more singularized and less likely to be overlapping. This means that the manipulation and object recognition is easier. This increases the processing rate e.g. tons/hour because the number of objects per hour which is fed to the robot increases.

The sensor 107 may be positioned upstream of the working area 102 so that detected parameters of the waste objects 104 may be sent to the controller 108 before the waste objects 104 enter the working area 102. The sensor 107 may comprise a plurality of different types of sensors 107. The sensor 107 or plurality of sensors 107 may be arranged at different positions outside or inside the working volume. In some examples the sensor 107 or plurality of sensors 107 may be arranged on, or in communication with, the manipulator 101 and/or gripper 103.

The sensor 107 may comprise any sensor suitable to detect a parameter of the waste object 104 e.g. one or more of an image sensor, a force sensor, a gyroscopic sensor, a motion sensor, an electric current sensor, a hall sensor, a metal detector, a temperature sensor, a chemical sensor, a visual and/or infrared spectroscopic detector, radioactivity sensor and/or a laser e.g. LIDAR. An image sensor may comprise one or more of an RGB camera, an infrared camera, a 3D imaging sensor, a terahertz imaging system.

The object parameters of the waste objects 104 may be detected by any of the mentioned sensors. For example, the geometrical dimensions and orientation of a waste object 104 may be determined from image data of the waste object 104 received from an image sensor 107. The image data may be used to determine any one of a size, shape, and volume of the waste object 104. Further, the image data may be utilized in a machine learning-based model to build up an object recognition capability of the waste sorting robot 100 as described further below. Thus, the recorded image data may be utilized to distinguish physical characteristics such as from what material the waste object 104 is made, and the associated material characteristics, besides from the geometrical dimensions and orientation of a waste object 104.

The image data may be combined with sensor data from any one of the aforementioned sensors. In one example, the position of the gripper 103 provides sensory input to the controller 108. E.g. the position of the gripper 103 in FIG. 3$a$, when engaging a waste object 104, may provide information of the height of the waste object 104 above the surface of the conveyor belt 113, i.e. the dimension of the waste object 104 in the Z-direction. This information may be utilized in combination with image data of the dimensions of the waste object 104 in the X- and Y-directions to determine a volume of the waste object 104. The controller 108 may be configured to determine an estimated weight of the waste object 104 based on the volume information. The controller 108 may thus be configured to determine the throw trajectory 109 based on the estimated weight. In a further example, the sensor 107 may comprise a force sensor, which may in communication with to the gripper 103 to detect the weight of a waste object 104 when being suspended by the gripper 103. FIG. 3$b$ shows a waste object 104$a$ being suspended by the gripper 103. The trajectory 109 may be determined based on the weight measured at this momentaneous position of the waste object 104$a$, optionally in combination with detected image data of the waste object 104$a$, and/or the aforementioned geometrical data in the Z-direction from the gripper 103, to further increase the accuracy of the weight estimation. It is further conceivable that the sensor 107 detects material characteristics of the waste object 104 to estimate the density thereof to further increase the accuracy of the weight estimation. E.g. the sensor 107 may comprise any of a metal sensor, a conductivity sensor, a hall sensor, to detect if the waste object 104 is made from a metal. Different sensor measurements may be combined to characterise the electric and magnetic characteristics of the metal, in order to distinguish between different metals, e.g. between iron, stainless steel and aluminium. Having identified the type of metal, the associated density may be combined with geometrical information determined for the waste object 104 to estimate the weight. A metal sensor may be connected to the gripper 103 to come into contact with the waste object 104 when the latter is engaged by the gripper, e.g. by having electrodes protruding from the surface of the gripper 103 being in contact with the waste object 104.

In some examples, the gripper 103 comprises a gyroscopic sensor, such as an electrical MEMS gyroscope used as a velocity sensor. The controller 108 may thus determine the acceleration and velocity of the gripper 103 during operation. The velocity of the gripper 103 may thus be monitored and controlled at the throw position 110 so that the velocity of the gripper 103 translates to the desired throw velocity ($v_0$) of the waste object 104 when being released from the gripper 103. The throw angle ($\varphi_0$) may be controlled by the X-, Y-, Z-movement of the gripper 103 and manipulator 101. For example, an upwards acceleration of the waste object 104 as illustrated in FIG. 3c may be achieved by an acceleration of the gripper 103 in the Z-direction, upwards from the conveyor belt 113. The waste object 104a continues its trajectory with a velocity component in the Z-direction after release from the gripper 103. The gripper 103 may continue with an upward movement in the Z-direction after release, to not interfere with the trajectory 109 of the thrown waste object 104a. The velocity component of the gripper 103 in the upwards Z-direction at the throw position 110 may be increased or decreased to vary the throw angle ($\varphi_0$). FIG. 3f show another example, where the gripper 103 and manipulator 101 moves in the Y-direction, without a velocity component in the Z-direction at the throw position 110. The throw angle ($\varphi_0$) is thus parallel with the horizontal direction.

The controller 108 may be configured to determine the throw trajectory 109 based on the object parameters and the picking position 105. The target position 106 may in some applications be at a defined distance, e.g. when having a single target chute extending along the working area 102. The picking position 105 may thus define the distance to the target position 106. The respective waste objects 104 may thus be accelerated and released with a throw velocity ($v_0$) and throw angle ($\varphi_0$) to be thrown along the different distances from the picking positions 105. This provides for a time effective sorting of the waste objects 104. It is however conceivable that some examples the throw position 110 is set to a defined distance from the target position 106, e.g. for waste objects 104 exceeding a certain weight, or having a high aerodynamic drag coefficient as described with reference to FIG. 6 above. In some examples, the controller 108 may be configured to determine the throw trajectory 109 based on the object parameters and the position of the target position 106. Several target positions 106 may be arranged along the working area 102 for more complex sorting applications. The distance a waste object 104 should be thrown thus depends on the location of the particular target position 106. In one example the throw position 110 is set to a defined position, regardless of the picking position 105, as mentioned above, while the distance to the target position 106 varies. In one example, the throw trajectory 106 is determined based on both the picking position 105 and the varying locations of the target positions 106. This provides for optimizing the throw trajectories 109 for a range of waste objects 104.

The throw position 110 may be determined based on the detected object parameters as described above. For example, turning to FIG. 3c, the throw position 110 is the position where the waste object 104a is released with throw velocity ($v_0$) and throw angle ($\varphi_0$) towards the target position 106. The waste object 104a may be released as soon as it has been accelerated to the throw velocity ($v_0$) along the desired throw trajectory 109. This allows for the gripper 103 target the next waste object 104b in the shortest amount of time. The time needed for the waste object 104a to reach its throw velocity ($v_0$), when accelerated by the gripper 103 and manipulator 101, depends on the detected object parameters, such as the weight and/or shape of the waste object 104a. E.g. a heavier waste object 104 may need to be accelerated over a longer distance in the working area 102 compared to a lighter waste object 104, due to the different inertias of the objects. Hence, the throw positions 110 may be uniquely determined for each of the waste objects 104a, 104b. As mentioned above, it is conceivable that in some example the throw position 110 may be set to a defined position for a certain range of waste objects 104. The throw velocity ($v_0$) and throw angle ($\varphi_0$) may still be adapted depending on the detected object parameters.

Figure 4:
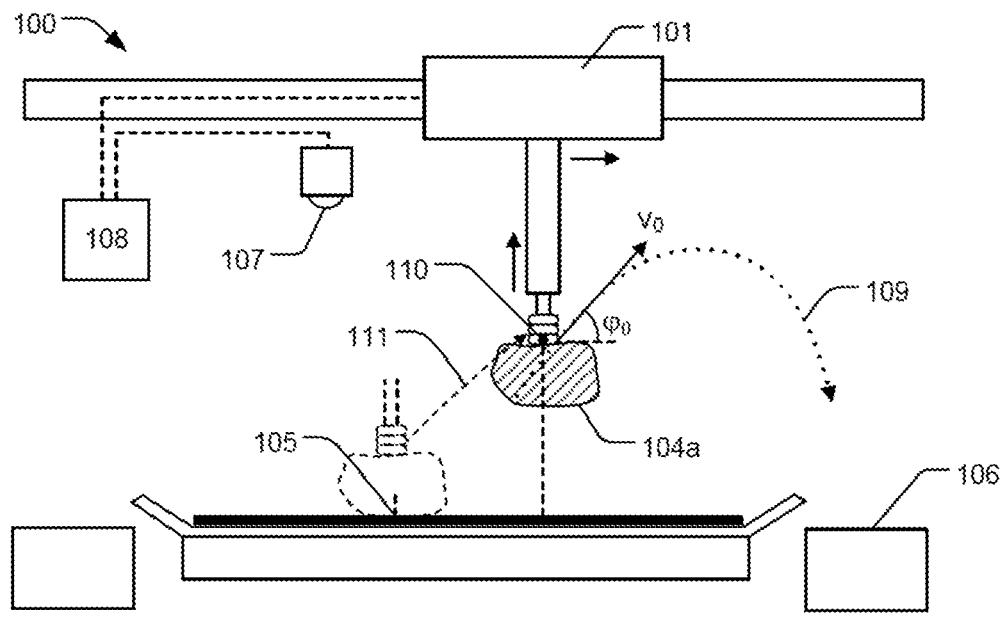
FIG. 4 shows a schematic front view of a waste sorting robot, where a gripper has moved another waste object to a throw position where the waste object is thrown to the target position.

The throw position 110 may be off-set a distance 111 from the picking position 105, in a direction towards the target position 106. FIG. 4 is a schematic illustration where a waste object 104a is moved to throw position 110 over an off-set distance 111. The waste object 104a is accelerated to a throw velocity ($v_0$) with a throw angle ($\varphi_0$) towards the target position 106 over a distance between the picking position 105 and throw position 110. The gripper 103 and manipulator 101 may not be able to throw the waste object 104a closer to the picking position 105, even though the throw velocity ($v_0$) and throw angle ($\varphi_0$) may be reached sooner, e.g. somewhere in the off-set distance 111. This may be the case if the waste object 104a exceeds a certain weight, and the gripper 103 and manipulator 101 is not able to throw the waste object 104a with a sufficiently high throw velocity ($v_0$) to cover a longer throw length. The waste sorting robot 100 may thus provide for a "gripper assisted trajectory" for heavy objects or light objects with a high drag force and erratic free movement through the air, as illustrated and described with respect to FIG. 6.

The controller 108 may be configured to determine the throw velocity ($v_0$) of the throw trajectory 109 by calculating a parabola of a projectile motion of the gripped waste object 104. The throw trajectory 109 may thus be estimated by a simplified model, i.e. parabola/projectile motion, where the aerodynamic drag force is not taken into account. The distance (x) travelled by the waste object 104 depends in this model only on time, the throw angle ($\varphi_0$) and the throw velocity ($v_0$); $x = v_0 \cdot t \cdot \cos(\varphi)$. The distance (x) may be determined from the picking position 105 and the target position 106. The throw angle ($\varphi_0$) may in some examples be set to a defined value, such as in the range of 30-60°, e.g. 35, 45 or 55°. The throw velocity ($v_0$) may consequently be determined from such projectile motion model. This may be particularly advantageous in some applications, e.g. where the waste objects 104 exhibit a minimum of drag force when thrown.

The controller 108 may be configured to determine a mass (m) of the gripped waste object 104 from the object parameters, e.g. based on parameters as exemplified above. The controller 108 may be configured to determine an acceleration of the gripped waste object 104 based on the determined or estimated mass (m) so that the waste object 104 is thrown with the throw velocity ($v_o$) from the throw position 110 to the target position 106. For example, given the relationship F=m·a=m·dv/dt, where F is the force acting on the waste object 104 and a is the acceleration thereof, provides; T=$v_o$·m/F, if the force F is constant during time a time T. Thus, T is the time the gripper 103 needs to apply force F to accelerate the waste object 104 with a mass (m) to the throw velocity ($v_o$).

Thus, accelerating the gripped waste object 104 to the throw velocity ($v_o$) may comprise applying a force (F) to the gripped waste object 104 during a time (T) by a movement of the gripper 103 and/or the manipulator 101. Alternatively, or in addition, the waste object 104 may be accelerated to the throw velocity ($v_o$) by applying an airflow to the gripped waste object 104, where the airflow is ejected from the gripper 103. Hence, a pressure from an airflow of a flow of a gas, ejected from the gripper 103 onto the waste object 104 applies a force onto the waste object 104 to accelerate the waste object 104. In some examples, the gripper 103 and/or manipulator 101 may accelerate the waste object 104 by a movement in the X-, Y-, Z-directions in combination with pushing the waste object 104 away from the gripper 103 by an airflow. The gripper 103 may in some examples comprise a suction gripper 103 comprising a suction cup configured to physically engage with a surface of the waste object 104. A negative pressure may be created in the suction cup so that the waste object 104 is held in place by the gripper 103 due to the force created by the negative pressure. The suction gripper 103 may be in fluid communication with a pneumatic system (not shown) to connecting the suction gripper 103 with a compressed air or gas supply. The air or gas supply to the suction gripper 103 may be reversed so that the negative pressure is released and a positive pressure may be exerted onto the waste object 104 to throw the waste object 104 as described above. In a further example, the gripper 103 comprises movable jaws to grip the waste objects 104, and a gas- or airflow connection to push and throw the waste objects 104 away from the gripper 103 when the jaws release their grip.

The controller 108 may be configured to determine the throw trajectory 109 by determining a drag force of the waste objects 104 based on the detected object parameters. This provides for determining a more accurate throw trajectory 109 of the waste objects 104. The efficiency of the waste sorting robot 100 may thus be further improved. This may be particularly advantageous where the waste objects 104 to be sorted includes objects with shapes and/or cross-sectional areas which exhibit a non-negligible impact from aerodynamic drag when being thrown in the air.

The controller 108 may be configured to determine a shape and/or cross-sectional area of the waste objects 104 based on the detected geometrical characteristics. The controller 108 may be configured to determine the drag force as being proportional to a drag coefficient which is based on the shape of the waste objects 104. For example, a sphere may have a lower drag coefficient that an angular box, even though the cross-sectional area may be the same. Alternatively, or in addition, the controller 108 may be configured to determine the drag force as being proportional the cross-sectional area of the waste object 104. Hence, a drag force $F_{drag}$ may be determined as $F_{drag}=-f(v) \cdot v$, where f(v) is a function characterising the drag force in dependence on the velocity (v), v is the velocity vector, and f(v) may be expressed as $f(v)=kpA \cdot v^2$, in one example where a quadratic dependence on the velocity is assumed, and k is the drag coefficient and depends on the shape, p the density of air, and A is the cross-sectional area of the waste object 104. The force (F) on the waste object may be expressed as $F=-mg \cdot y + F_{drag} = -mg \cdot y - kpA \cdot v^2 \cdot v$, with motion vector y, and gravity g.

Figure 5:
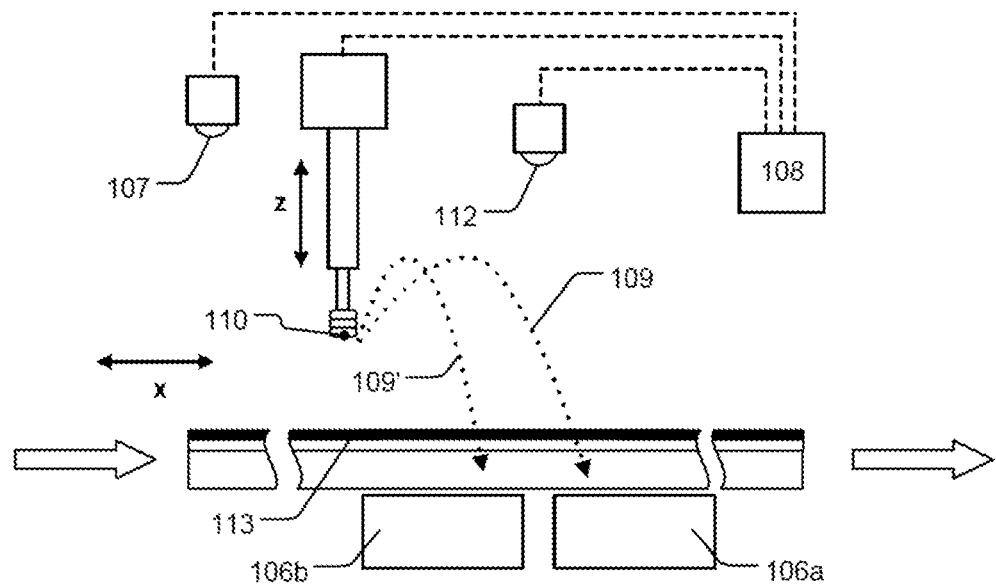
FIG. 5 shows a schematic side view of a waste sorting robot, where a determined throw trajectory of a waste object towards a target position is compared to a detected position of the waste object.

The waste sorting robot 100 may comprise a throw sensor 112 configured to determine the position of a waste object 104 after being thrown to the target position 106. FIG. 5 is a schematic illustration of a waste sorting robot 100, with a side view along the X-direction. The conveyor belt 113 moves in the direction of the arrows indicated in FIG. 5. Two different target positions are shown 106a and 106b. The controller 108 is configured to receive the position of the waste object 104 being thrown as throw data 109'. The dotted path 109' in FIG. 5 indicates the actual position of the waste object 104 when being thrown from the throw position 110. Thus, the actual position of the waste object 104 is referred to as the throw data 109'. The controller 108 may be configured to associate the throw data 109' and the detected object parameters of the thrown waste object 104 to a waste object model. I.e. a model may be created where different categories of waste objects 104, based on their respective object parameters, are associated with the actual throw data 109' of such different categories of waste objects 104. As a new waste object 104 is to be sorted to a target position 106, the object parameters obtained from any of the above mentioned sensors 107 may be compared to the categories of waste objects 104 in the waste object model so that the closest matching throw data 109' may be identified.

In some examples, the throw data 109' established for some categories of waste objects 104 may not agree with the desired throw trajectory 109 towards the correct target position 106. FIG. 5 illustrates an example of a throw trajectory 109 towards a target position 106a. The waste object 104 is however thrown as indicated by the throw data 109', in this case to the wrong target position 106b. The controller 108 may thus be configured to determine deviations in the position of the thrown waste object 104 by comparing the throw data 109' with the throw trajectory 109. The controller 108 may be configured to determine control instructions to the gripper 103 and/or manipulator 101 based on the deviations, and associate the determined control instructions to the waste object model. Hence, as the next waste object 104 is identified as having similar object parameters as a previous waste object 104 having associated throw data 109', the control instructions in the model have been updated to compensate of the previous deviation from the throw trajectory 109. The next waste object 104 may thus be thrown to the correct target position 106a, e.g. by increasing the length of the throw in the example of FIG. 5. In some examples, it may not be possible to identify a particular waste object 104 in the waste object model, e.g. in an initial start-up phase of the waste sorting robot 100 when the amount of determined object parameters and associated throw data 109' is limited. The controller 108 may be configured to approximate, e.g. by interpolation techniques of the available data in the model, an estimated throw trajectory 109 of the particular waste object 104. The resulting throw data 109' may then be recorded and the control instructions may be iteratively updated for the particular waste object type by continuously comparing the throw data 109' with the desired throw trajectory 109. The waste object model may thus be continuously built and refined to be applicable to a growing number of different types of waste objects 104.

Building of the waste object model as described in the example above may be part of a machine learning-based capability of the controller 108 and the waste sorting robot 100. Thus, the controller 108 may be configured to input the throw data 109' and the object parameters to a machine learning-based model to determine the control instructions for subsequently gripped waste objects 104. In some examples, the sensor 107 may comprise an imaging sensor, such as a camera. Object parameters for the different waste objects 104 may be determined from the image data received from the sensor 107. Different image features, such as shapes, colours, geometrical relationships etc of the detected waste objects 104 may be assigned as the characterising object parameters in a waste object model, to create e.g. different categories of waste objects. The waste object model may be continuously populated with the throw data 109' for the respective categories of waste objects, to continuously adapt the associated control instructions. The categorization of the waste objects 104 may be continuously refined by analysing and comparing the image data of waste objects 104 having similar throw data 109' for a similar set of control instructions. The same principle may be applied to any of the sensor data received from any of the aforementioned sensors 107.

Figure 7:
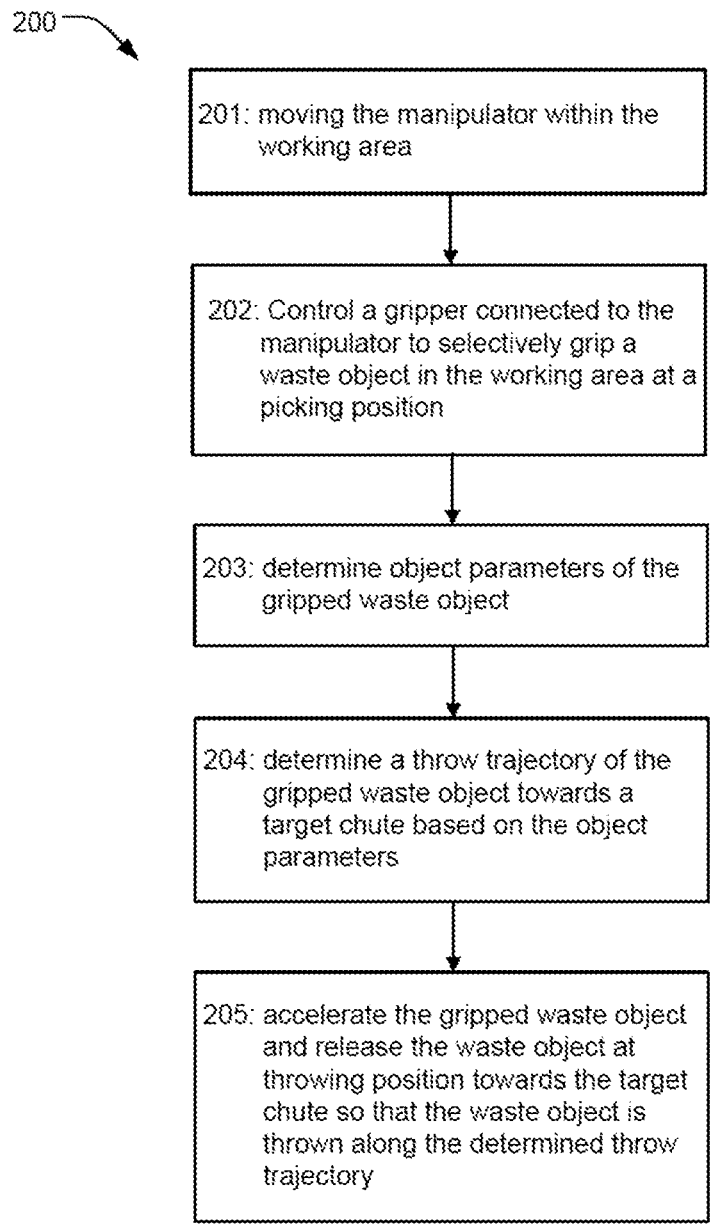
FIG. 7 shows a flowchart of a method of controlling a waste sorting robot.

FIG. 7 is a flowchart of a method 200 of controlling a waste robot 100. The method 200 comprises moving 201 a manipulator 101 within a working area 102, controlling 202 a gripper 103 connected to the manipulator 101 to selectively grip a waste object 104 in the working area 102 at a picking position 105 and throw the waste object to a target position 106. The method 200 comprises determining 203 object parameters of the waste objects 104. The object parameters comprise the orientation and/or physical characteristics of the respective waste objects 104. For the respective waste objects 104 being selectively gripped by the gripper 103, the method 200 comprises determining 204 an associated throw trajectory 109 of the gripped waste object 104 towards the target position 106 based on the determined object parameters. The method 200 comprises sending 205 control instructions to the gripper 103 and/or manipulator 101 so that the gripper 103 and/or manipulator 101 accelerates the gripped waste object 104 and releases the waste object 104 at a throw position 110 with a throw velocity ($v_0$) and throw angle ($\varphi_0$) towards the target position 106. The waste object 104 is thrown along the determined throw trajectory 109 associated with the waste object 104, from the throw position 110 to the target position 106. The method 200 thus provides for the advantageous benefits as described above with reference to the waste sorting robot 100 and FIGS. 1-6. The method 200 provides for a more effective waste sorting robot 100.

A computer program product is provided comprising instructions which, when the program is executed by a computer, cause the computer to carry out the steps of the method 200.

In another example two or more examples are combined. Features of one example can be combined with features of other examples.

Examples of the present disclosure have been discussed with particular reference to the examples illustrated. However it will be appreciated that variations and modifications may be made to the examples described within the scope of the disclosure.

The invention claimed is:

1. A waste sorting robot comprising:
a manipulator movable within a working area,
a gripper connected to the manipulator, wherein the gripper is configured to selectively grip a waste object of a plurality of waste objects in the working area at a picking position and throw the waste object to a target position,
a sensor configured to detect a plurality of object parameters of the plurality of waste objects, the plurality of object parameters comprising at least one of an orientation or physical characteristics of the plurality of waste objects, and
a controller in communication with the sensor and being configured to receive the plurality of object parameters, wherein, for the waste object of the plurality of waste objects being selectively gripped by the gripper, the controller is configured to:
determine a throw trajectory of the waste object towards the target position based on one or more object parameters of the waste object, and
send control instructions to at least one of the gripper or manipulator to cause at least one of the gripper or manipulator to accelerate the waste object and release the waste object at a throw position with a throw velocity and throw angle towards the target position so that the waste object is thrown along the throw trajectory from the throw position to the target position;
wherein the controller is configured to determine the throw trajectory by determining a drag force of the waste object based on the one or more object parameters.

2. The waste sorting robot according to claim 1, wherein the physical characteristics comprise at least one of geometrical or material characteristics of the plurality of waste objects.

3. The waste sorting robot according to claim 2, wherein the at least one of geometrical or material characteristics of the plurality of waste objects comprises at least one of a size, shape, density, surface properties, or composition of the plurality of waste objects.

4. The waste sorting robot according to claim 1, wherein the sensor comprises an image sensor, a force sensor, a motion sensor, an electric current sensor, a temperature sensor, or a chemical sensor.

5. The waste sorting robot according to claim 1, wherein the controller is configured to determine the throw trajectory based on at least one of: the one or more object parameters and the picking position or the target position.

6. The waste sorting robot according to claim 1, wherein the throw position is determined based on the one or more object parameters.

7. The waste sorting robot according to claim 1, wherein the throw position is offset a distance from the picking position in a direction towards the target position.

8. The waste sorting robot according to claim 1, wherein the controller is configured to determine the throw velocity by calculating a parabola of a projectile motion of the waste object.

9. The waste sorting robot according to claim 1, wherein the controller is configured to:
determine a mass of the waste object from the one or more object parameters, and
determine an acceleration of the waste object based on the mass so that the waste object is
thrown with the throw velocity from the throw position to the target position.

10. The waste sorting robot according to claim 1, wherein accelerating the waste object to the throw velocity comprises at least one of: applying a force to the waste object during time by a movement of at least one the gripper or manipulator or applying an air- or gas flow to the waste object, wherein the air- or gas flow is ejected from the gripper.

11. The waste sorting robot according to claim 1, wherein the controller is configured to determine at least one of a shape or cross-sectional area of the waste object based on one or more geometrical characteristics of the waste object, and determine the drag force as being proportional to a drag coefficient based on at least one of the shape or the cross-sectional area.

12. A waste sorting robot comprising:
a manipulator movable within a working area,
a gripper connected to the manipulator, wherein the gripper is configured to selectively grip a waste object of a plurality of waste objects in the working area at a picking position and throw the waste object to a target position,
a sensor configured to detect a plurality of object parameters of the plurality of waste objects, the plurality of object parameters comprising at least one of an orientation or physical characteristics of the plurality of waste objects,
a throw sensor configured to determine a position of the waste object after being thrown to the target position; and
a controller in communication with the sensor and being configured to receive the plurality of object parameters, wherein, for the waste object of the plurality of waste objects being selectively gripped by the gripper, the controller is configured to:
determine a throw trajectory of the waste object towards the target position based on one or more object parameters of the waste object,
send control instructions to at least one of the gripper or manipulator to cause at least one of the gripper or manipulator to accelerate the waste object and release the waste object at a throw position with a throw velocity and throw angle towards the target position so that the waste object is thrown along the throw trajectory from the throw position to the target position,
receive the position as a throw data,
associate the throw data and the one or more object parameters of the waste object to a waste object model to be applied to subsequently gripped waste objects,
determine one or more deviations in the position of the waste object by comparing the throw data with the throw trajectory,
determine control instructions to at least one of the gripper or manipulator based on the one or more deviations, and
associate the control instructions to the waste object model.

13. The waste sorting robot according to claim 12, wherein the controller is further configured to input the throw data and the one or more object parameters to a machine learning-based model to determine the control instructions for subsequently gripped waste objects.

14. A method of controlling a waste robot comprising:
moving a manipulator within a working area,
controlling a gripper connected to the manipulator to selectively grip a waste object of a plurality of waste objects in the working area at a picking position and throw the waste object to a target position,
determining a plurality of object parameters of the plurality of waste objects, the plurality of object parameters comprising at least one of orientation or physical characteristics of the plurality of waste objects, and
for the waste object being selectively gripped by the gripper:
determining a throw trajectory of the waste object towards the target position based on one or more object parameters of the waste object, and
sending control instructions to at least one of the gripper or manipulator to cause at least one of the gripper or manipulator to accelerate the waste object and release the waste object at a throw position with a throw velocity and throw angle towards the target position so that the waste object is thrown along the throw trajectory from the throw position to the target position,
wherein determining the throw trajectory further comprises determining a drag force of the waste object based on the one or more object parameters.

15. A non-transitory computer program product storing instructions which, when executed by a computer, cause the computer to carry out the method according to claim 14.

16. The method according to claim 14, wherein the throw trajectory is determined based on at least one of: the one or more object parameters and the picking position or the target position.

17. The method according to claim 14, wherein the throw position is offset a distance from the picking position in a direction towards the target position.

18. The method according to claim 14, wherein accelerating the waste object to the throw velocity comprises at least one of: applying a force to the waste object during time by a movement of at least one the gripper or manipulator or applying an air- or gas flow to the waste object, wherein the air- or gas flow is ejected from the gripper.

* * * * *